C. BINKS.
FUEL VAPORIZER FOR INTERNAL COMBUSTION ENGINES.
APPLICATION FILED APR. 14, 1917.
1,239,079.
Patented Sept. 4, 1917.
2 SHEETS—SHEET 1.
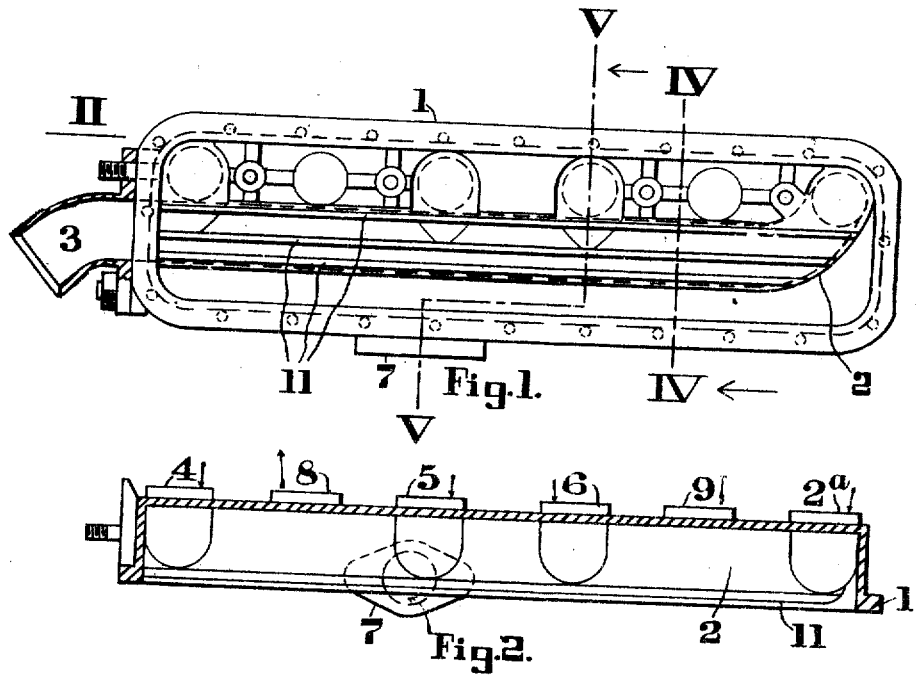
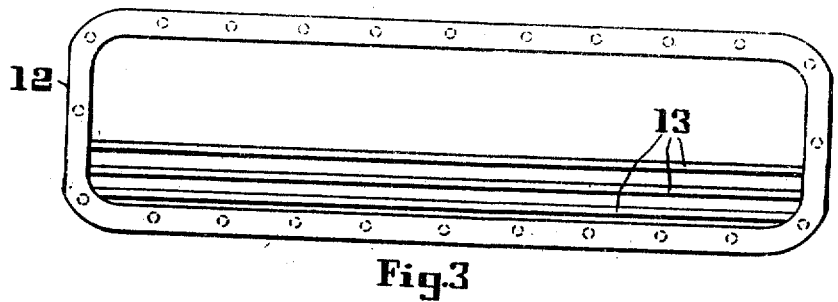
Fig.3
Inventor:—
Charles Binks
by Herbert W. Jenner
Attorney

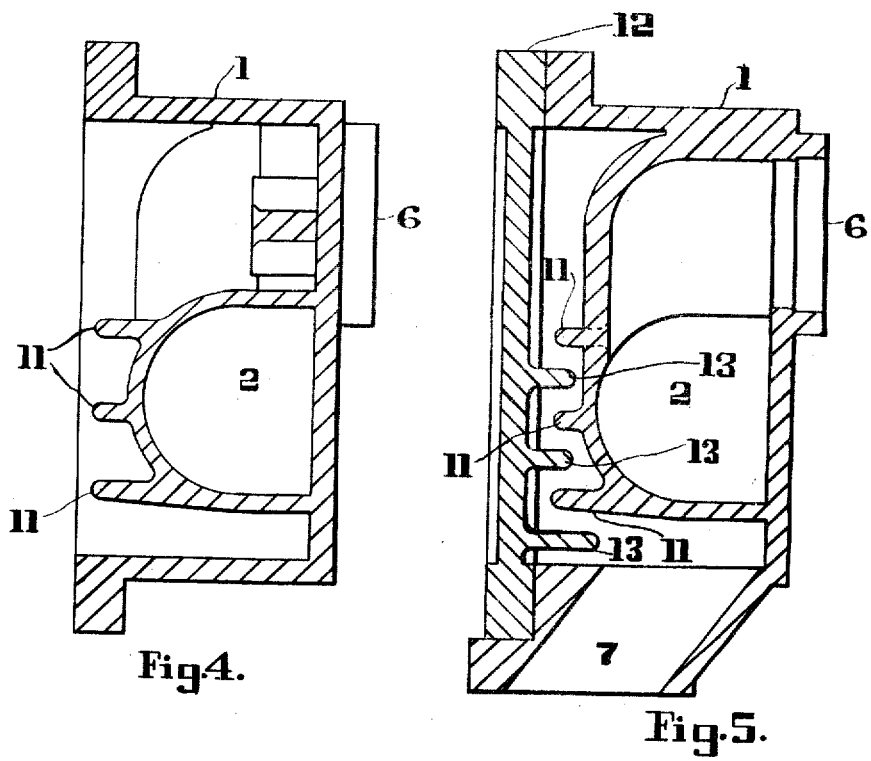

UNITED STATES PATENT OFFICE.

CHARLES BINKS, OF MANCHESTER, ENGLAND.

FUEL-VAPORIZER FOR INTERNAL-COMBUSTION ENGINES.

1,239,079.  Specification of Letters Patent.  Patented Sept. 4, 1917.

Application filed April 14, 1917. Serial No. 162,150.

*To all whom it may concern:*

Be it known that I, CHARLES BINKS, residing at 67 Snowdon road, Eccles, Manchester, England, have invented certain new and useful Improvements in Fuel-Vaporizers for Internal-Combustion Engines; and I do hereby declare the following to be a full, clear, and exact description of the invention, such as will enable others skilled in the art to which it appertains to make and use the same.

The subject of this invention is an apparatus for vaporizing paraffin, petroleum and other fuel for internal combustion engines, after such fuel leaves the carbureter.

This invention consists in the novel construction and combination of the parts hereinafter fully described and claimed whereby the fuel is vaporized by contact with ribs formed on the engine exhaust pipe.

The accompanying drawings show an example of the application of this invention.

Figure 1 is a front elevation of a vaporizer with the lid removed.

Fig. 2 is a sectional plan of the same taken on the line II in Fig. 1.

Fig. 3 is an elevation of the inside of the lid.

Fig. 4 is a transverse section on a larger scale taken on the line IV in Fig. 1.

Fig. 5 is an enlarged transverse section taken on the line V in Fig. 1 and showing also in section the lid in position.

The reference numeral 1 indicates the shell of the box, 2 the exhaust pipe passing longitudinally through the box and discharging through the bend 3. (Fig. 1). Ports 4, 5, 6 and 2ª connect this pipe 2 with the engine outlets. The air and atomized fuel from the carbureter enter the vaporizer at 7 and pass through ports at 8 and 9 to the engine inlets. The exhaust pipe having three or other number of longitudinal ribs 11, and the lid 12 having also ribs 13 which as shown in Fig. 5 are arranged to alternate with the ribs 11 or to enter the spaces between the latter, but without touching either the exhaust pipe or its ribs, the fuel gases must therefore take a zig-zag course, which increases the length of their travel in contact with the hot metal of the exhaust pipe, or in other words increases the effective heating area of the exhaust pipe in relation to the gases on their way from the inlet 7 to the engine.

The inlet 7 for the fuel is placed at the middle part of the bottom of the elongated box 1, below the exhaust pipe 2, and the box 1 has the exhaust ports and fuel ports arranged in a row on its rear side. The cover 12 closes the open front side of the box, and its ribs 13 and the ribs 11 on the exhaust pipe are arranged longitudinally so that the fuel passes crosswise of them from the inlet 7 to the inlet ports of the engine.

The cover 12 is reversible, and, if desired, it may be secured with its ribs 13 projecting outwardly, so as to offer less resistance to the fuel in its passage over the ribs 11 of the exhaust pipe.

Claims:—

1. A fuel vaporizer, comprising an elongated box having an exhaust pipe arranged longitudinally of it and at its rear side, said box being open in front and having an inlet for the fuel at its lower part below the exhaust pipe and having fuel outlets at its upper part above the exhaust pipe, and said exhaust pipe having longitudinal ribs on its rear side which project toward the open front side of the box, and a cover secured to the box over its open front side and having longitudinal ribs which project rearwardly from it into the spaces between the ribs on the exhaust pipe.

2. A fuel vaporizer for internal combustion engines comprising a box located between the engine and the carbureter and communicating with both, a ribbed exhaust conduit passing through the said box, and a reversible lid having a plain side and a ribbed side, the ribs on the latter being adapted to enter the spaces between the ribs on the said exhaust conduit.

In testimony whereof I affix my signature, in presence of two witnesses.

CHARLES BINKS.

Witnesses:
ROSE GOLDMAN,
FLORENCE BRADBURN.